United States Patent
Janssen

(10) Patent No.: US 6,540,362 B1
(45) Date of Patent: Apr. 1, 2003

(54) SCROLLING MULTI-STRIPE COLOR ILLUMINATION SYSTEM

(75) Inventor: Peter J. Janssen, Scarborough, NY (US)

(73) Assignee: Koninklijke Philips Electronics N.V., Eindhoven (NL)

(*) Notice: Subject to any disclaimer, the term of this patent is extended or adjusted under 35 U.S.C. 154(b) by 104 days.

(21) Appl. No.: 09/635,112

(22) Filed: Aug. 9, 2000

(51) Int. Cl.[7] .............................................. G03B 21/28
(52) U.S. Cl. ........................... 353/31; 353/20; 353/38; 353/84; 359/204
(58) Field of Search .................. 353/31, 33, 84, 353/38, 30, 20; 359/204, 211; 348/742

(56) References Cited

U.S. PATENT DOCUMENTS

| | | | | |
|---|---|---|---|---|
| 5,150,205 A | * | 9/1992 | Um et al. | 359/209 |
| 5,371,543 A | * | 12/1994 | Anderson | 348/270 |
| 5,428,467 A | | 6/1995 | Schmidt | 359/40 |
| 5,479,187 A | * | 12/1995 | Chen | 345/102 |
| 5,548,347 A | * | 8/1996 | Melnik et al. | 348/761 |
| 5,669,687 A | * | 9/1997 | Yang | 353/98 |
| 5,845,981 A | | 12/1998 | Bradley | 353/31 |
| 6,219,110 B1 | * | 4/2001 | Ishikawa et al. | 348/759 |
| 6,266,105 B1 | * | 7/2001 | Gleckman | 348/743 |

FOREIGN PATENT DOCUMENTS

| | | |
|---|---|---|
| EP | 0492721 A2 | 7/1992 |
| EP | 0601666 A1 | 6/1994 |
| JP | 08022006 A | 1/1996 |
| JP | 08211358 A | 8/1996 |
| JP | 2000-137191 * | 4/1998 |
| WO | 9526110 A1 | 9/1995 |

OTHER PUBLICATIONS

Patent Abstracts of Japan, vol. 2000, No. 08, Oct. 6, 2000, JP 2000137191 A.

* cited by examiner

*Primary Examiner*—William Dowling
(74) *Attorney, Agent, or Firm*—Steven R. Biren

(57) ABSTRACT

Single panel scrolling color projection systems using three (red, blue and green) scrolling color stripes have been demonstrated to be adequate for television images. However, computer graphics displays are more prone to color artifacts. The invention increases the number of scrolling color stripes in order to suppress these artifacts. One implementation is to break up the three color stripes into multiple bands using a lenticular lens array, and then to collimate the multiple stripes with a second lens array. The collimated stripes are scrolled using the rotating prism of the prior systems.

3 Claims, 2 Drawing Sheets

SCROLLING MULTI-STRIPE COLOR ILLUMINATION SYSTEM

BACKGROUND OF THE INVENTION

The present invention relates to an improvement in scrolling color illumination, which is presently implemented in a single panel liquid crystal (LC) projection system that is suitable for television. The improvement is a system that is suitable for demanding computer monitor applications.

PRIOR ART

Scrolling color illumination was patented and implemented in a single panel LC projection system by Philips Electronics North America Corporation, showing a picture quality deemed suitable for television. Computer applications are much more demanding than television because some computer-generated patterns can provoke color breakup, an artifact common to all color sequential displays, much more easily than natural television images. This color breakup makes it more difficult for a color sequential system to penetrate the personal computer monitor market.

Color flashes can be observed in high contrast patterns through rapid eye movements, for instance when blinking. Human sensitivity to this artifact can be explained as a discrepancy between the exposure of the retina's peripheral vision to colored light and the black and white image the central vision system was adapted to.

As prior art, there may be mentioned: U.S. Pat. No. 5,845,981; EP 601,666; EP 492,721; U.S. Pat, No. 5,428,467; WO 95/26110; Kokai 08-211,358, 08-022,006. None of these references shows a continuously scrolling architecture, which is characteristic of the scrolling color illumination systems of the invention.

SUMMARY OF THE INVENTION

It is an object of the present invention to provide improved scrolling color illumination suitable for use in computer monitors.

It is an object of the present invention to provide scrolling color illumination that is suitable for use in a rear projection desktop monitor.

It is another object of the present invention to provide multiple color stripes to suppress color artifacts in computer displays.

These objects, as well as further objects which will become apparent from the discussion that follows, are achieved, in accordance with the present invention, by a scrolling multi-stripe color illumination system comprising means for generating more than three color stripes and a means for scrolling the multiple color stripes.

Single panel scrolling color projection systems using three (red, blue and green—RGB) scrolling color bands have been demonstrated to be adequate for television images. However, computer graphics are more prone to color artifacts. The invention increases the number of scrolling color bands in order to suppress these artifacts. One implementation of the scrolling multi-stripe color illumination system comprises breaking up the three color stripes into multiple stripes using a lenticular lens array, collimating the multiple stripes with a second lens array, and scrolling the collimated stripes using a rotating prism of the prior systems.

Another implementation of scrolling multi-stripe color illumination system of the invention comprises a polarizing beamsplitter, which reflects light from a source through a lens subsystem and a quarter waveplate onto a rotating drum, from which multiple colored stripes are retro-reflected back through the lens subsystem and the quarter waveplate, which enables the retro-reflected light to pass through the polarizing beamsplitter, and the retro-reflected multiple colored stripes produced are directed onto a light valve, producing a scrolling pattern of colored light.

By exposing the eye to multiple color stripe images, rather than a single one, during rapid eye movements, the impression of a different color in the peripheral vision region is removed. The scrolling color system lends itself particularly well to such a solution. Unlike the "write, wait and expose" sequence used in other color sequential systems, the system of the invention enables continuous addressing of an arbitrary number of color stripes without adding overhead.

PREFERRED EMBODIMENTS OF THE INVENTION

Figure 1:
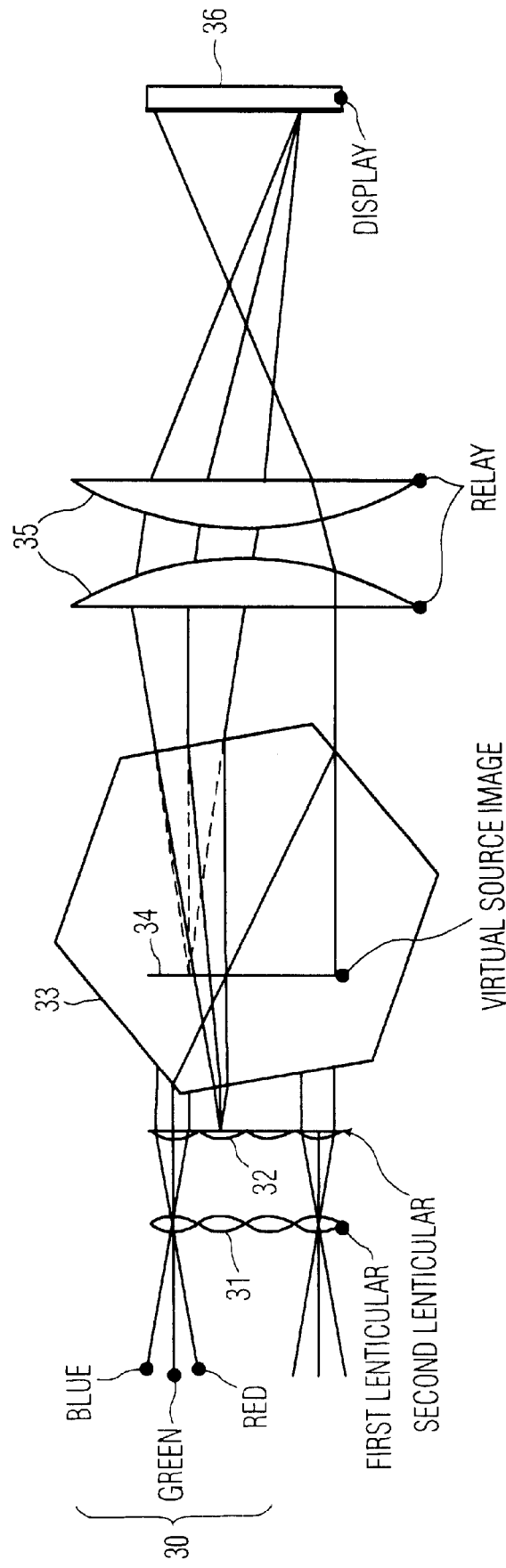
FIG. 1 shows part of illumination optics for creating multiple color stripes on a display.
Figure 2:
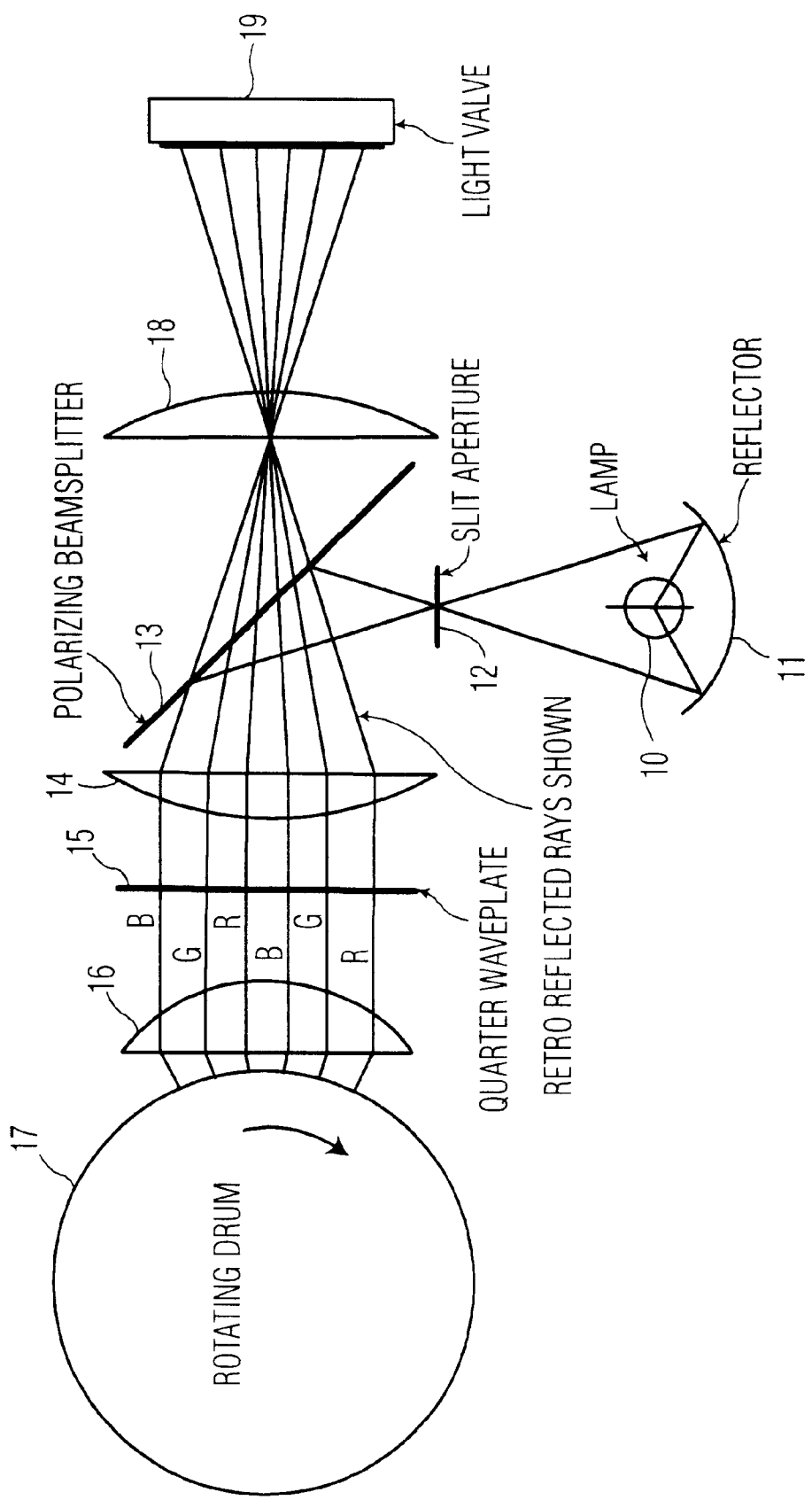
FIG. 2 shows part of another illumination optics for creating multiple color stripes on a display.

In FIG. 2, light from lamp 10 is reflected and directed by reflector 11 though slit aperture 12 and onto polarizing beamsplitter 13, where it is reflected through focusing lens 14, quarter waveplate 15 and focusing lens 16 onto rotating drum 17. Multiple colored stripes are retro-reflected back from the rotating drum 17 through lens 16, through quarter waveplate 15, which enables the-retro-reflected light to pass through the polarizing beamsplitter 13 after it passes through lens 14. The retro-reflected multiple colored stripes produced are then directed through focusing lens 18 onto light valve 19, creating a scrolling pattern of colored light. The drum 17 rotates at a relatively slow rate. A motion corresponding with one RGB stripe period requires a full RGB refresh of the panel. FIG. 1 shows part of another illumination optics system for creating multiple color stripes. Three colored beams 30, formed from a single beam of white light by means of dichroic filters (not shown) are broken up into an array of color stripes using a lens array 31. A second array 32 coplanar with the color stripes, recollimates the off-axis light so that the light entering the refractive scanning prism 33 is telecentric. The virtual image 34 of the stripe pattern moves vertically as the prism 33 rotates. This secondary source is imaged onto the light valve 36 after passing through relay 35.

The foregoing has shown and described a novel scrolling multi-stripe color illumination system, which fulfills all the objects and advantages sought therefor. Many changes, modifications, variations and other uses and applications of the subject invention will, however, become apparent to those skilled in the art after considering this specification which discloses the preferred embodiments thereof. All such changes, modifications, variations and other uses and applications which do not depart from the spirit and scope of the invention are deemed to be covered by the invention, which is to be limited only by the claims which follow.

What is claimed is:

1. A scrolling multi-stripe color illumination system comprising means for generating more than three color stripes from beams of three colors, means for scrolling the color stripes, and means for breaking up the three color stripes into multiple stripes using a lenticular lens array, colluminating the multiple stripes with a second lens array, and scrolling the collimated stripes using a rotating prism.

2. A scrolling multi-stripe color illumination system as claimed in claim 1 wherein the three colors are red, blue and green.

3. A scrolling multi-stripe color illumination system as claimed in claim 1 which comprises a polarizing beamsplitter, which reflects light from a source through a lens subsystem and a quarter waveplate onto a rotating drum, from which multiple colored stripes are retro-reflected back through the lens subsystem and the quarter waveplate, which enables the retro-reflected light to pass through the polarizing beamsplitter, and the retro-reflected multiple colored stripes produced are directed onto a light valve, producing a scrolling pattern of colored light.

* * * * *